US006900847B1

(12) United States Patent
Agneta et al.

(10) Patent No.: US 6,900,847 B1
(45) Date of Patent: May 31, 2005

(54) VIDEO HARDWARE AND SOFTWARE SYSTEM

(75) Inventors: Roi D. Agneta, Park City, UT (US);
Tom Rosenbauer, Easton, PA (US);
Steve Howe, Massapequa, NY (US);
Doug Green, Smithtown, NY (US);
Frank Koblyinski, Brooklyn, NY (US);
Margaret Tillman, Commack, NY (US); Scott Hynes, Huntington Station, NY (US)

(73) Assignee: Chyron Corporation, Melville, NY (US)

( * ) Notice: Subject to any disclaimer, the term of this patent is extended or adjusted under 35 U.S.C. 154(b) by 506 days.

(21) Appl. No.: 09/628,120

(22) Filed: Jul. 28, 2000

Related U.S. Application Data
(60) Provisional application No. 60/146,762, filed on Jul. 30, 1999.

(51) Int. Cl.[7] .............................................. H04N 5/262
(52) U.S. Cl. ....................... 348/552; 348/571; 348/578; 348/722; 345/723; 345/502
(58) Field of Search ................................ 348/552, 571, 348/575, 578, 584, 722; 345/716, 718, 723, 719, 502, 501; 386/52, 55; 709/250, 218, 220, 227, 232, 231, 238; 707/104.1

(56) References Cited

U.S. PATENT DOCUMENTS

| | | | | | |
|---|---|---|---|---|---|
| 5,872,565 | A | * | 2/1999 | Greaves et al. ............. 345/723 |
| 5,898,441 | A | * | 4/1999 | Flurry ......................... 345/546 |
| 6,078,338 | A | * | 6/2000 | Horan et al. ................. 345/535 |
| 6,084,600 | A | * | 7/2000 | Munshi ....................... 345/545 |
| 6,091,778 | A | * | 7/2000 | Sporer et al. ............... 375/240 |
| 6,114,622 | A | * | 9/2000 | Draeger ..................... 174/35 R |
| 6,198,477 | B1 | * | 3/2001 | Kurtze et al. ............. 707/500.1 |
| 6,226,038 | B1 | * | 5/2001 | Frink et al. .................. 348/443 |
| 6,232,974 | B1 | * | 5/2001 | Horvitz et al. .............. 345/419 |
| 6,292,194 | B1 | * | 9/2001 | Powell, III .................. 345/582 |
| 6,311,204 | B1 | * | 10/2001 | Mills .......................... 709/100 |
| 6,317,165 | B1 | * | 11/2001 | Balram et al. .............. 348/699 |
| 6,370,198 | B1 | * | 4/2002 | Washino ................. 375/240.26 |
| 6,449,422 | B1 | * | 9/2002 | Ebisawa ....................... 386/52 |

OTHER PUBLICATIONS

U.S. Provisional application Ser. No. 60/146,762, filed Jul. 30, 1999.
DUET Backplane Technical Specification, Engineering Release Version, Steve Howe, Jun. 11, 1998.
DUET Technical Overview, Preliminary Draft of Work–in–Progress, Matt Allard, et al., Dec. 1, 1997.
Lyric Real Time 3D Graphics Application, Handbook, CHYRON Corporation, Pub. No. 2A02111 Feb. 12, 1999.
CHYRON FAQ, CHYRON Product Marketing, 1999.
CHYRON Duet Reference Guide, Jan.–Mar. '99, v 1.2.
DUET Ordering Guide, Jan.–Mar. '99, v 1.5, CHYRON Product Marketing, 1999.

(Continued)

*Primary Examiner*—Michael H. Lee
*Assistant Examiner*—Jean W. Désir
(74) *Attorney, Agent, or Firm*—Lerner, David, Littenberg, Krumholz & Mentlik, LLP

(57) ABSTRACT

A computer hardware system for editing a video signal includes, a first signal bus employing a first bus interface, and a second signal bus employing a second bus interface and adapted to carry at least one video signal. The system desirably further includes a general purpose computer connected to the first bus and operating according to a first operating system; and a video graphics computer connected to the first signal bus and the second signal bus. The video graphics computer operates according to a second operating system. The video graphics computer is adapted for editing the video signal transmitted along the second signal bus according to commands from the general purpose computer.

3 Claims, 14 Drawing Sheets

OTHER PUBLICATIONS

CHYRON CAL Developer Reference Guide, CHYRON Product Marketing, 1998.

Duet Feature/Benefit Analysis, Jan.–Mar. '99, CHYRON Product Marketing, 1999.

INFINIT! Graphic Workstations and Applications for the Digital Future, CHYRON, 1999.

MAX!> Graphic Workstations and Applications for the Digital Future, CHYRON, 1999.

MAXINE! Graphic Workstations and Applications for the Digital Future, CHYRON, 1999.

INFINIT! MAX!> and MAXINE! Enhancements Graphic Workstations and Applications for the Digital Future, CHYRON, 1999.

Duet HD Ordering Guide, Jan.–Mar. '99, v 1.5, CHYRON Product Marketing, 1999.

LYRIC Animation Graphic Workstations and Applications for the Digital Future, CHYRON, 1999.

DUET and DUET HD Graphic Workstations and Applications for the Digital Future, CHYRON, 1999.

DUET CHYRON, Hardware Reference Guide, CHYRON Corporation.

CHYRON Software Document CAL v 1.0 Specification, Pub. No. 2A02108, Revision A, CHYRON Corporation, Jan. 1999.

* cited by examiner

GLINT VIDEO GRAPHICS ENGINE

MIXER

A/B MIX

VIDEO HARDWARE AND SOFTWARE SYSTEM

CROSS-REFERENCE TO RELATED APPLICATIONS

The present application claims benefit of U.S. Provisional Patent Application 60/146,762, filed Jul. 30, 1999, the entire disclosure of which is incorporated by reference herein.

FIELD OF THE INVENTION

The present invention is related to a scalable, computer hardware and software platform for a video processing system.

BACKGROUND OF THE INVENTION

The present invention relates to multimedia processing. One example of multimedia processing is the processing of video, audio or combined video and audio signals to apply special effects to a single signal, or to combine two or more such signals in a specified manner, or to perform both processing and combining. For example, in a television production environment, the producer may want to distort the video from one source according to some geometric scheme, transpose portions of another video signal according to a different scheme which varies with time in some way, and combine these two processed video signals in a particular manner to form a composite output signal. It would be desirable to combine the advantage of a computer operating according to a conventional operating system, with the special-purpose media processing devices. Such device can operate, for example, according to a real-time operating system and can process multimedia data at speeds not readily achievable in a conventional multipurpose computer.

SUMMARY OF THE INVENTION

One aspect of the invention provides a computer hardware system for editing a video signal comprising:
- a first signal bus employing a first bus interface;
- a second signal bus employing a second bus interface and adapted to carry at least one video signal;
- a general purpose computer connected to said first bus and operating according to a first operating system; and
- a video graphics computer connected to said first signal bus and said second signal bus, said video graphics computer operating according to a second operating system, said video graphics computer being adapted for editing said video signal transmitted along said second signal bus according to commands from said general purpose computer. Preferably, the second signal bus includes an array of point-to-point interconnects, said video signal being carried by said second signal bus along one or more of said point-to-point interconnects.

A further aspect of the invention provides methods of editing a video channel. The method according to this aspect of the invention desirably includes the steps of inputting user commands for manipulating said video channel to a first processor operating according to a first operating system and processing said user commands in said first processor. The method desirably further includes the steps of transferring video instructions based upon said input user commands to a video processor connected to said first processor; and processing said video instructions in said second processor so as to perform said editing of said video signal.

DETAILED DESCRIPTION OF THE PREFERRED EMBODIMENTS

Hardware

DUET is a real-time, multipurpose, media processing platform based on proprietary hardware developed by Chyron. The DUET platform integrates a 300 MHz Pentium II computer running Windows NT with an i960 RISC processor, a dedicated graphic chipset (GMX2000) and custom DSP hardware (display controller, video mixers, image resizers), with video DMA controllers and memory over a dual bus interface. The hardware components comprising the DUET hardware are described in detail in the "Hardware Reference Guide" the "DUET Technical Overview" and the "DUET Backplane Technical Specification" included as part of the aforesaid provisional application 60/146,762, which is incorporated herein by reference.

Duet provides a:

High bandwidth YUV/RGB Chyron backplane which is selectable for digital television ("DTV") resolutions.

Seven high speed slots for Chyron video processing modules.

Six RU rack mount chassis with auto-switching power supply.

3D graphics and chips sets on video graphics engine for real time 2D/3D graphics display and animation. Graphics boards are scalable to all digital television ("DTV") resolutions. The system can support up to 5 video graphics engines.

Chyron YUV IO boards accommodate multiple SDI video/key inputs and outputs, as well as interfacing with time code data, an NSX form factor plug-in computer with an Intel CPU, 10/100 Base-T, USB, serial, parallel, keyboard and mouse ports.

Microsoft Windows NT 4.0 operating system for GUI, disk I/O, networking, etc.

Distributed processing driver between the real time operating system running on dedicated processors and Windows NT operating on the Intel Pentium II.

Eight slots on backplane for standard PCI based board solutions (digital audio, display, SCSI & Networking).

CAL hardware abstraction layer compliant.

Figure 1:
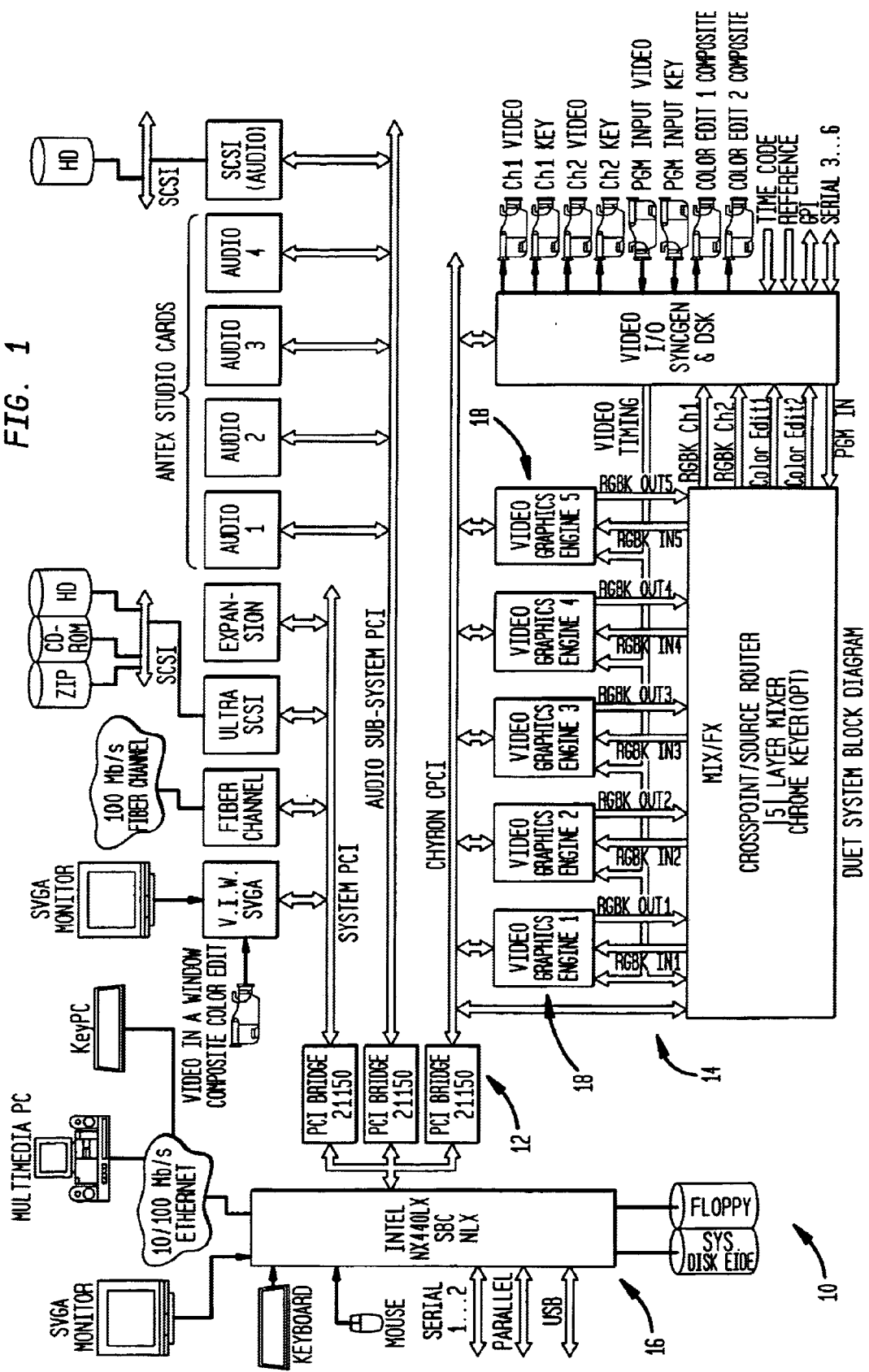
FIGS. 1 and 2 are block diagrams depicting certain components of a system in accordance with one embodiment of the invention.
Figure 2:
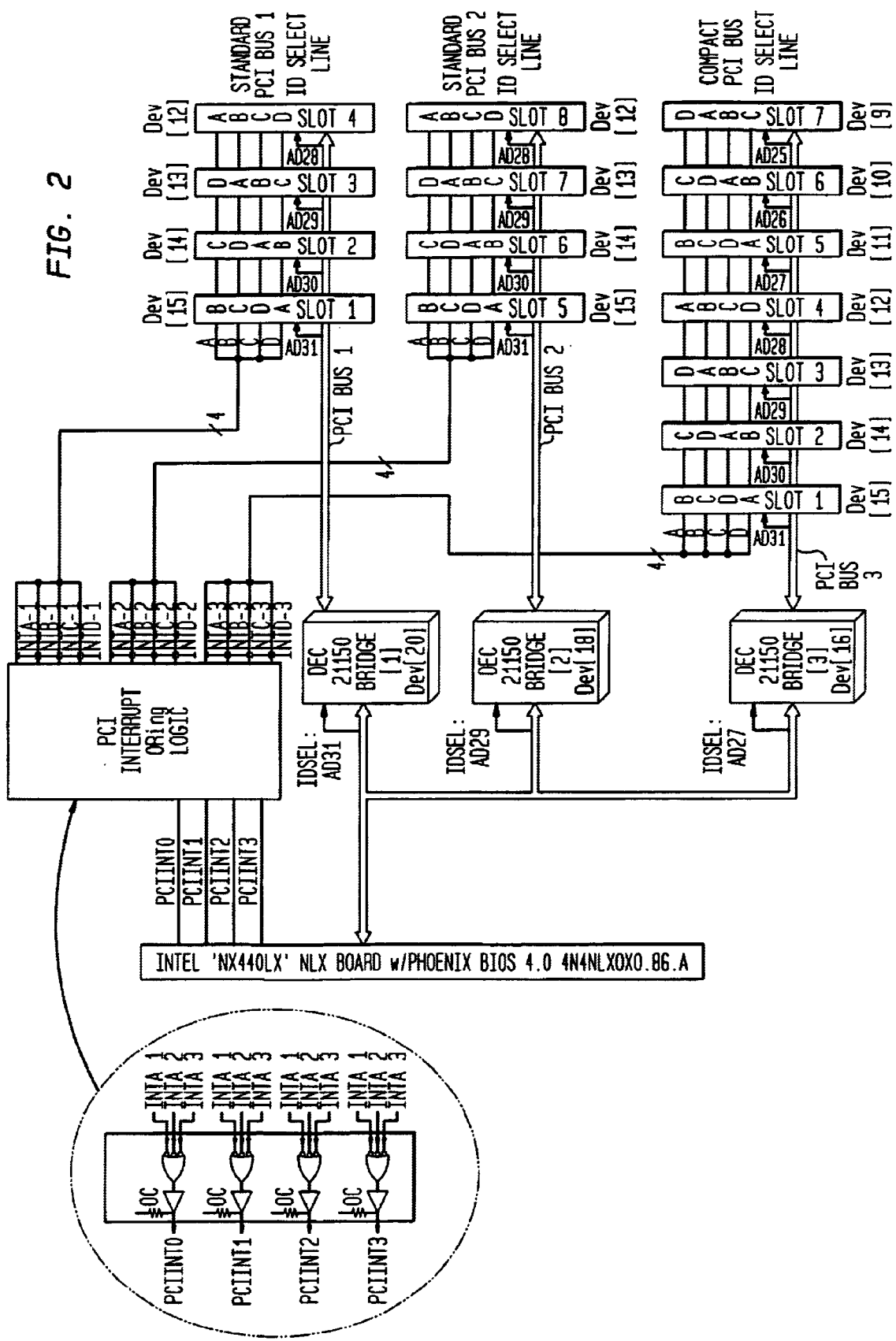
Figure 3C:
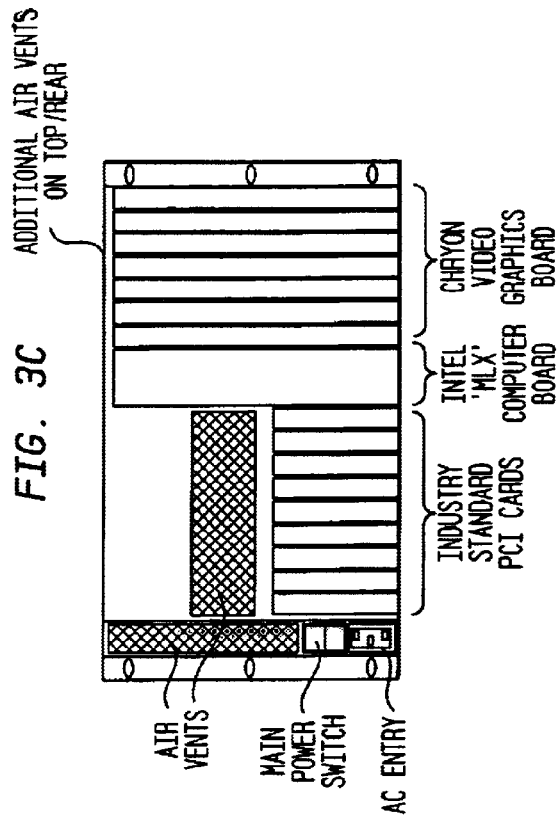
FIGS. 3A–3C are, respectively, side, front and rear elevational views of a chassis used in the apparatus of FIGS. 1–2.
Figure 3D:
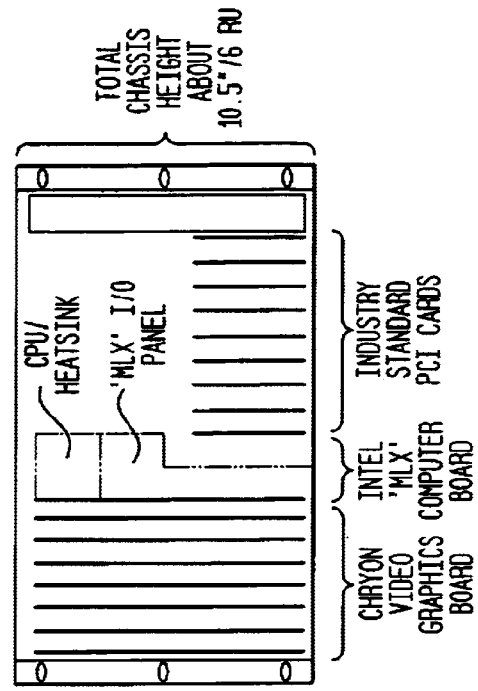
FIG. 3D is a front elevational view of the chassis of FIGS. 3A–3C, with certain elements removed for clarity of illustration.
Figure 3A:
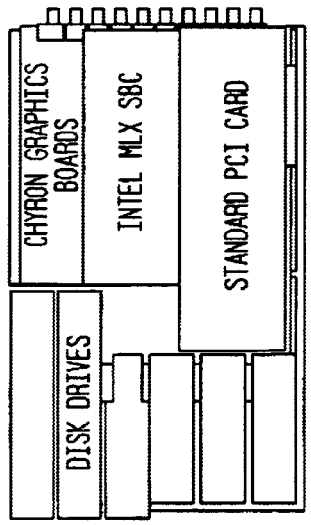
Figure 3B:
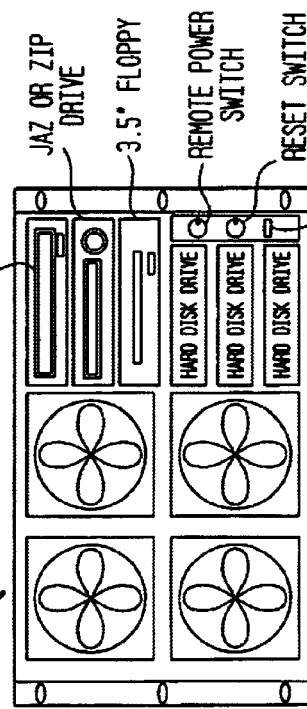
Figure 4:
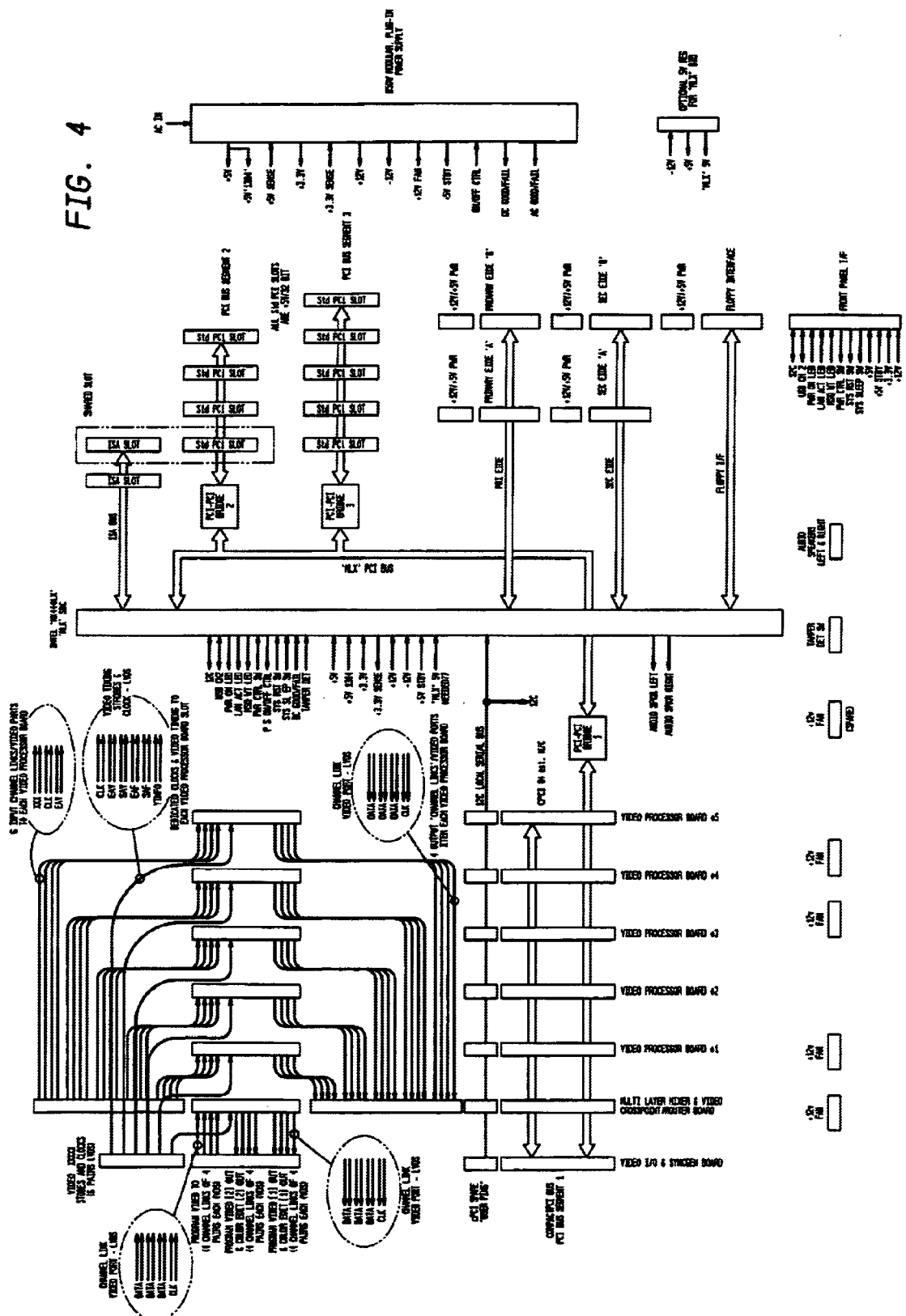
FIGS. 4–9 are further block diagrams of the system of FIGS. 1-3-D
Figure 5:
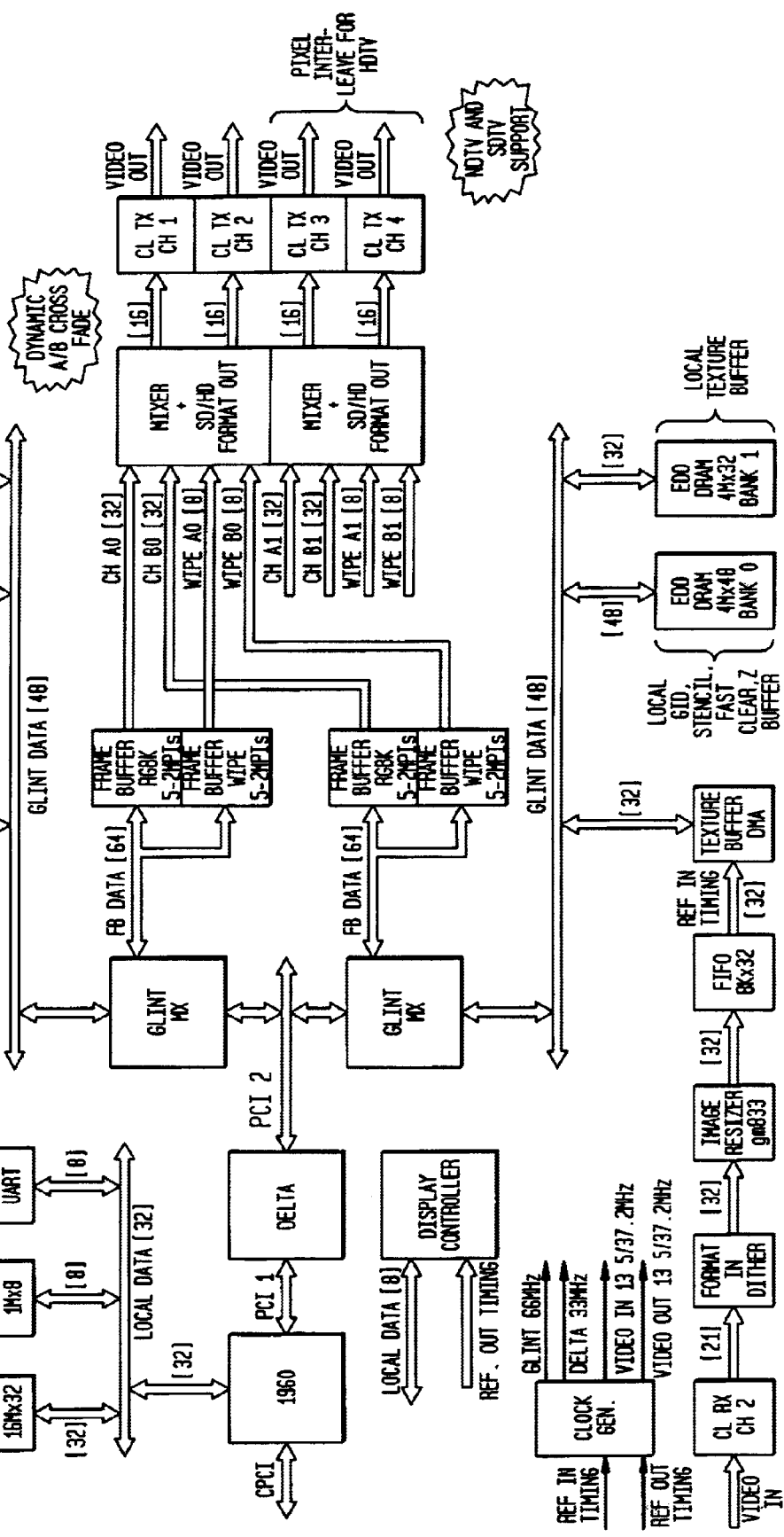
Figure 6:
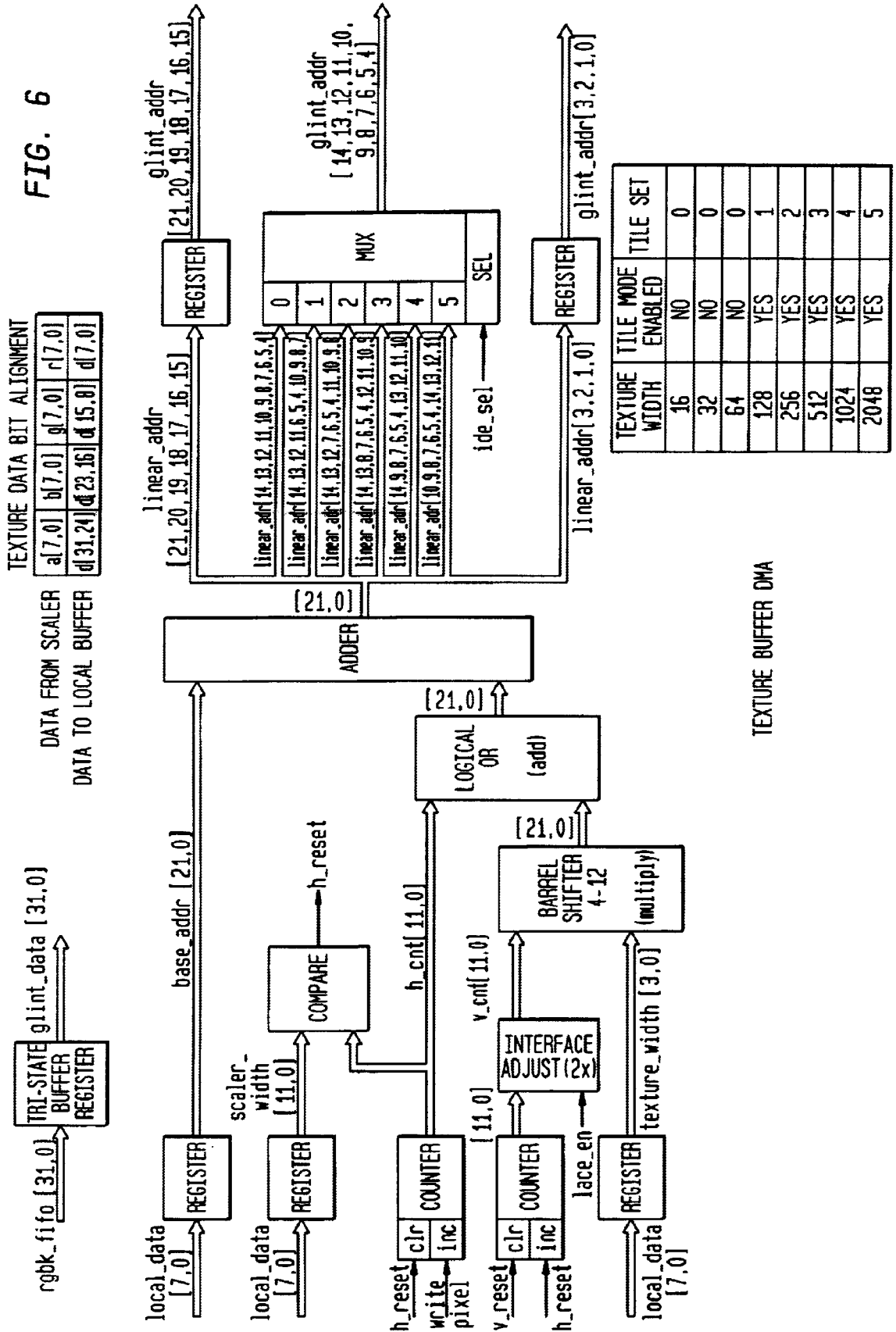
Figure 7:
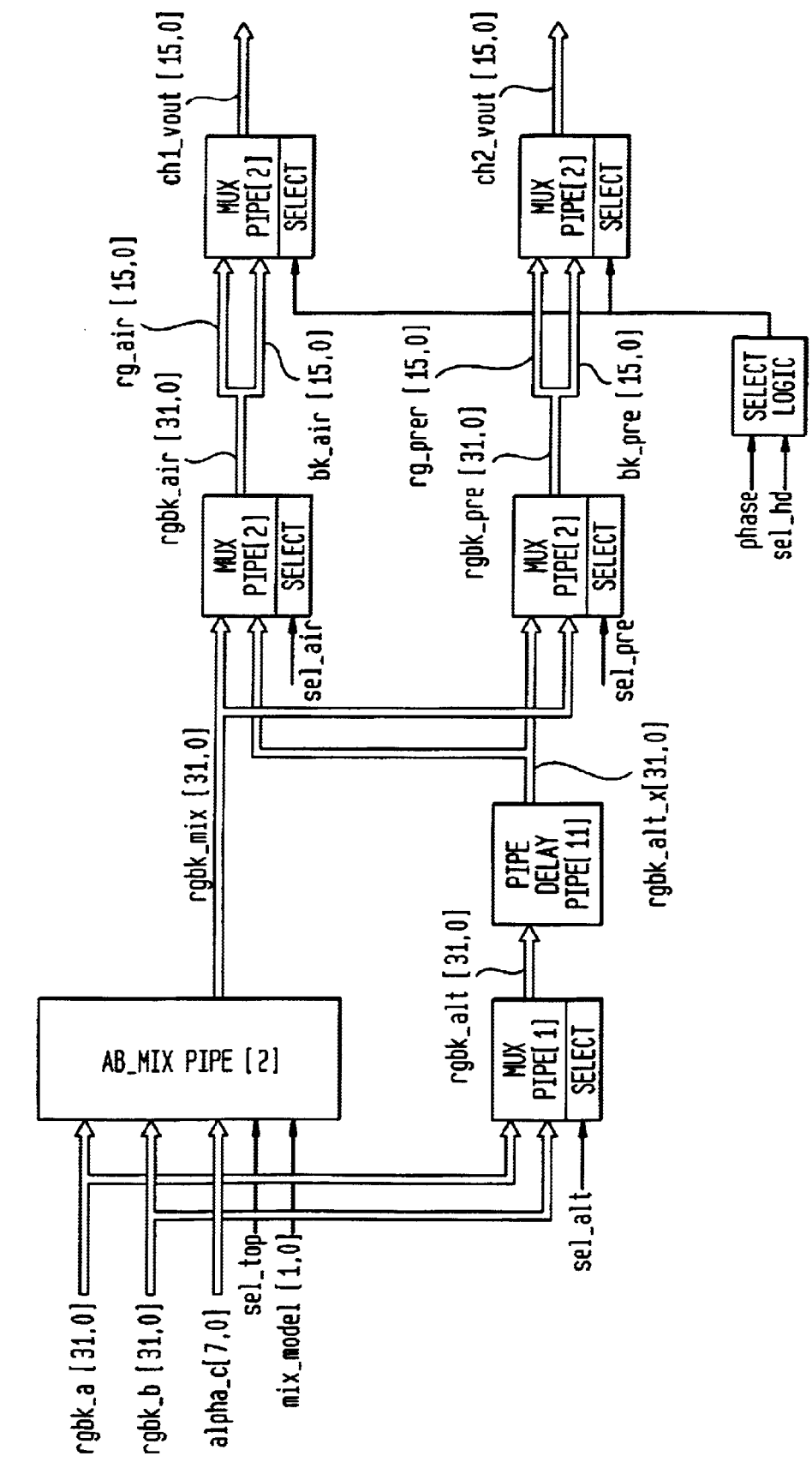
Figure 8:
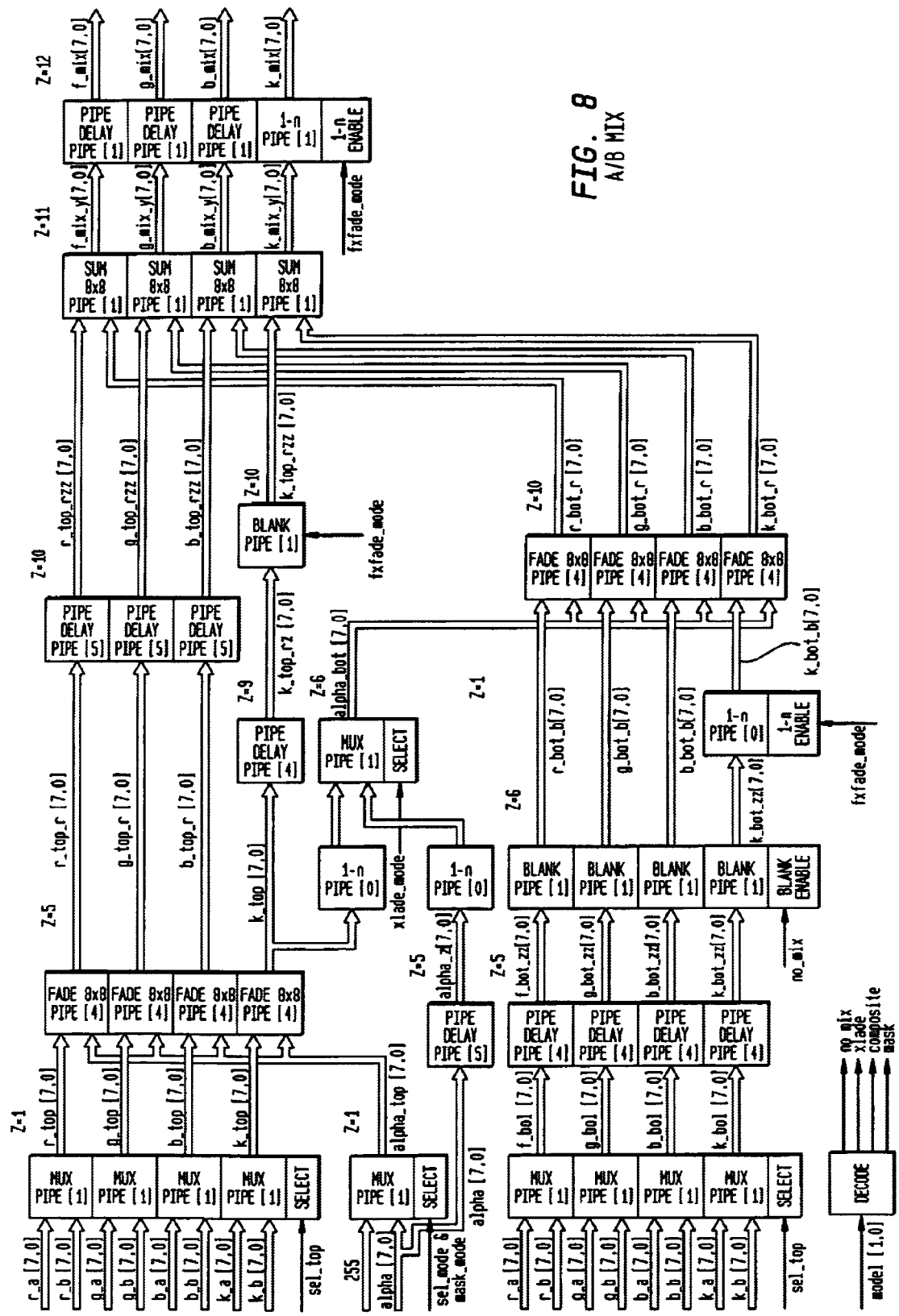
Figure 9:
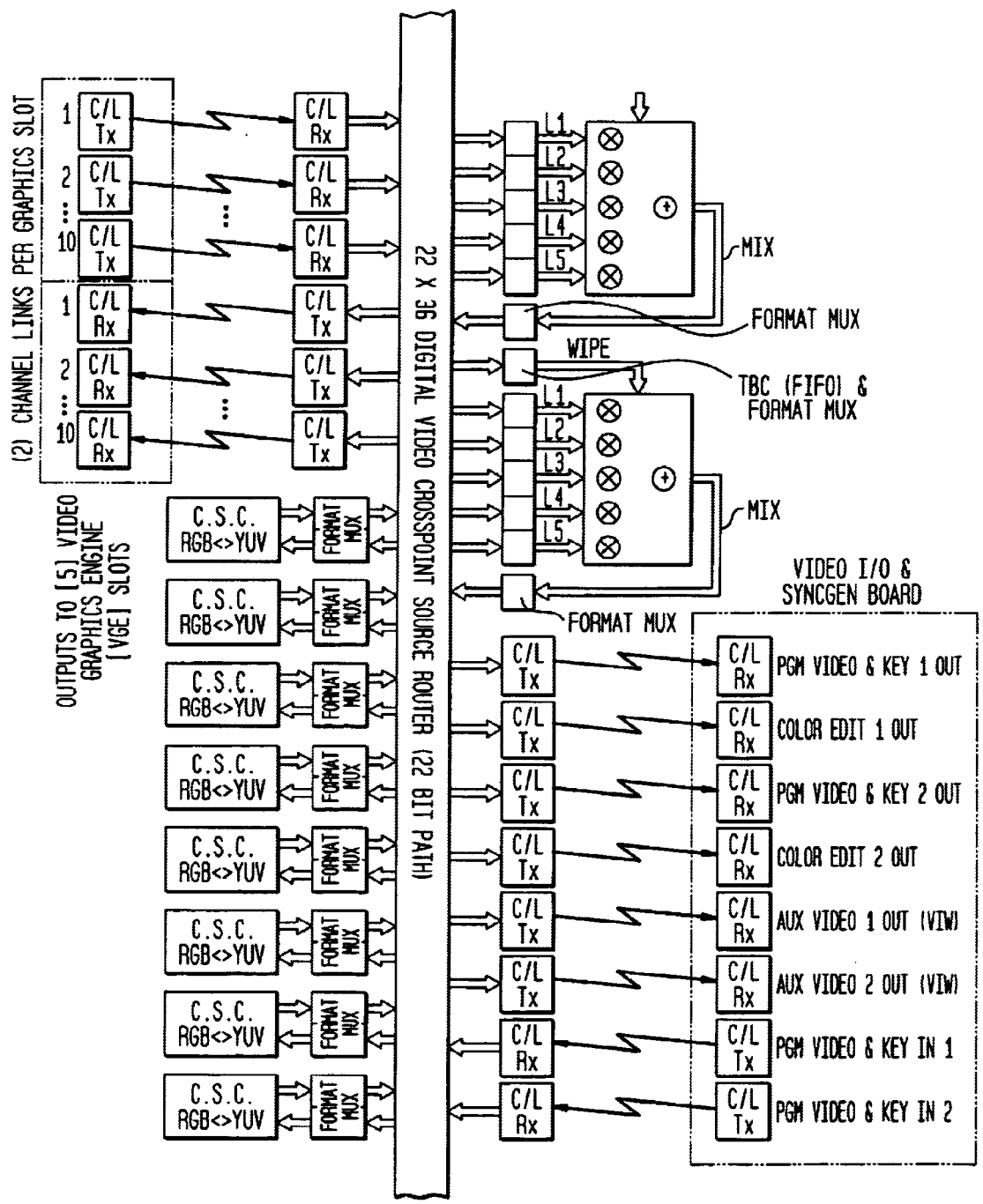
Figure 10:
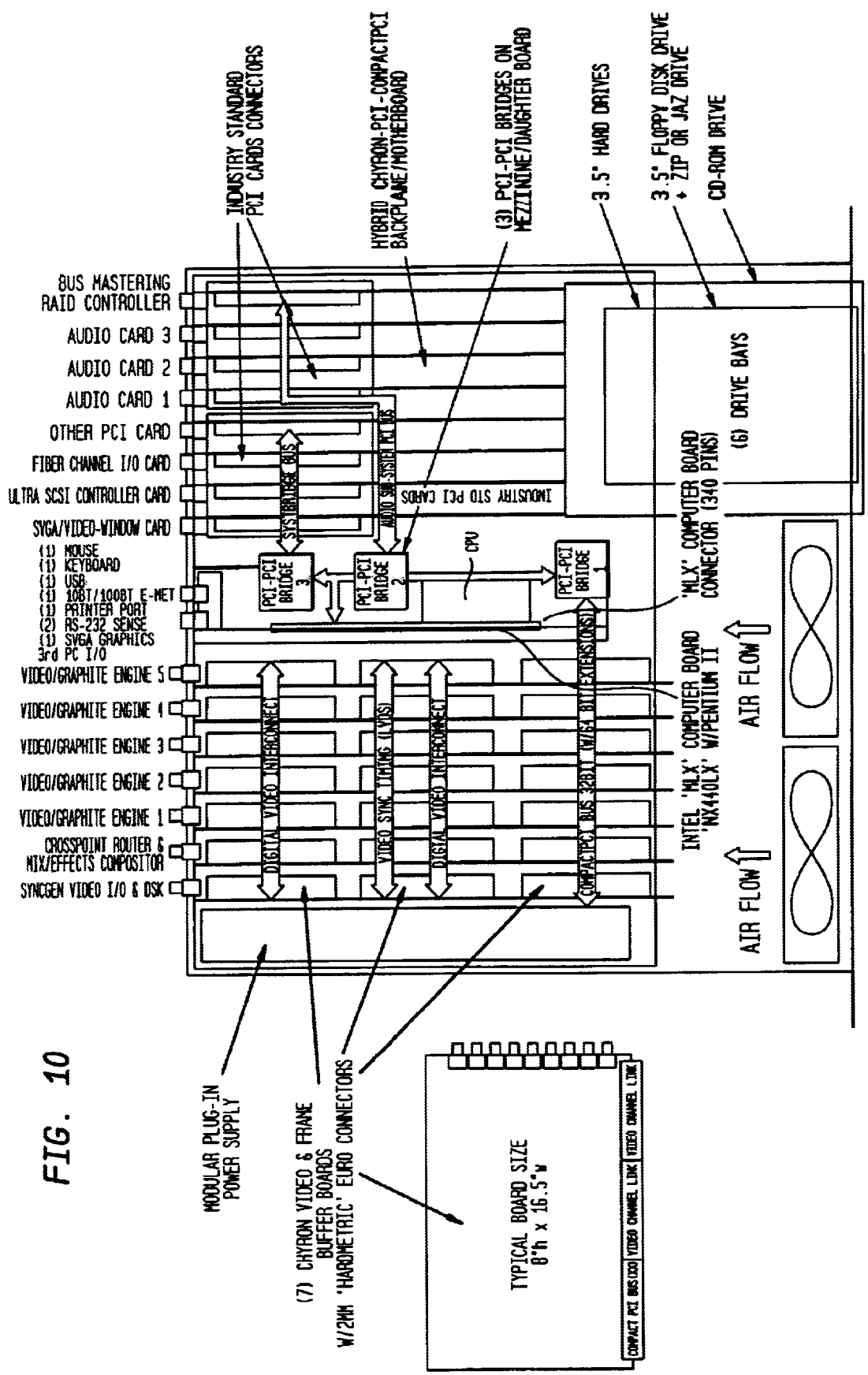
FIG. 10 is a diagrammatic plan view of a chassis used in the system of FIGS. 1–9.
Figure 11:
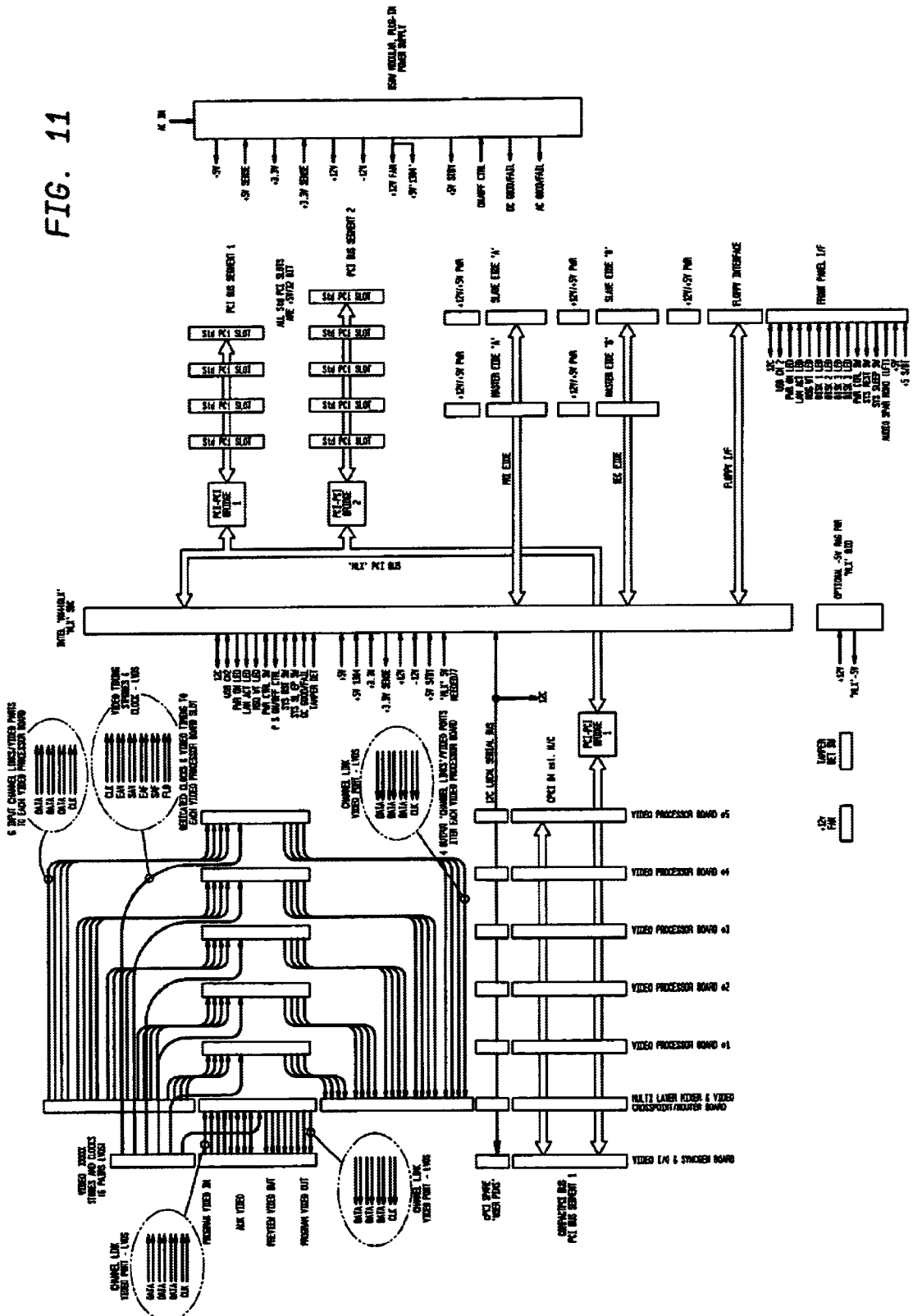
FIGS. 11 and 12 are still further block diagrams of the system of FIGS. 1–10.
Figure 12:
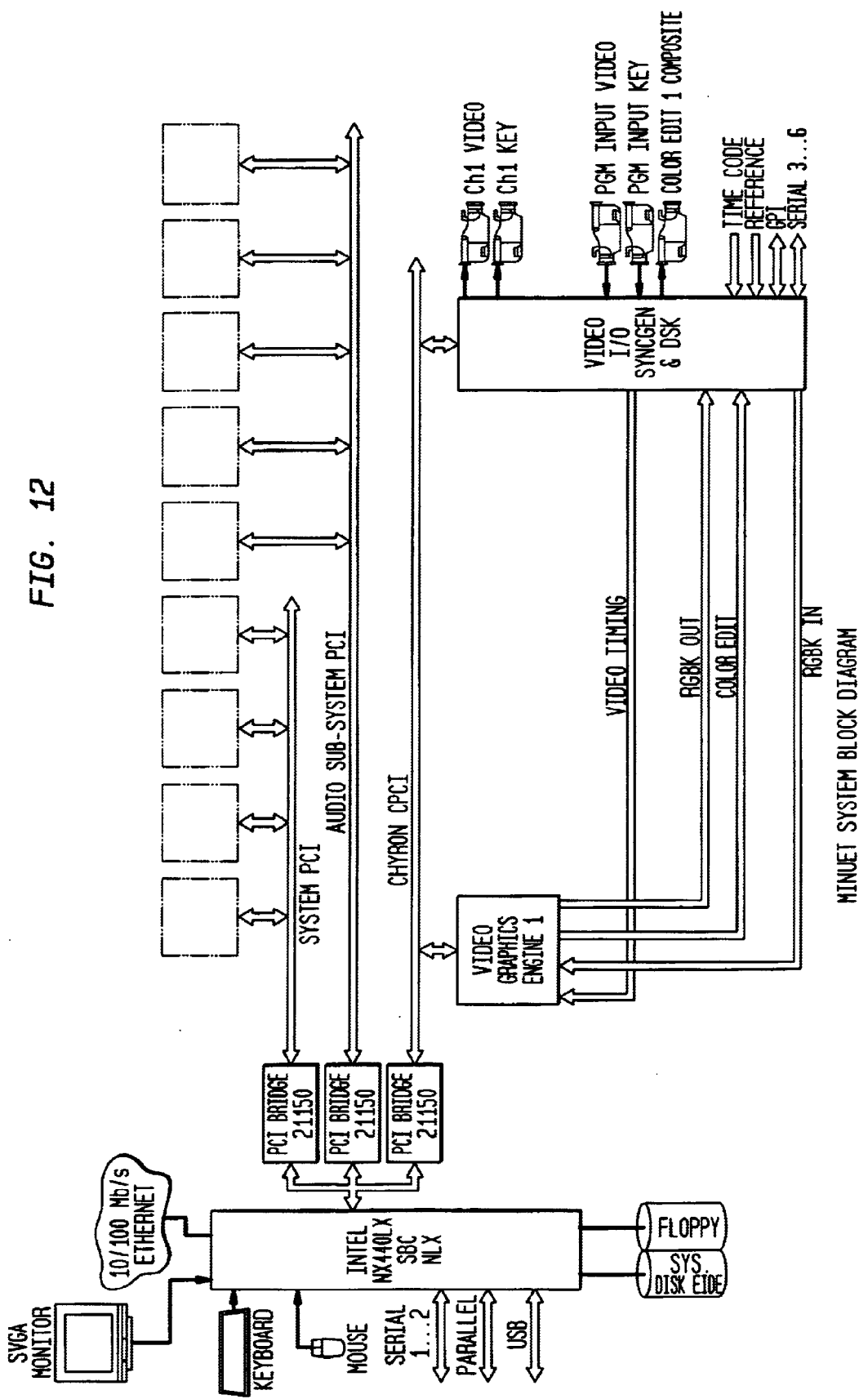
Figure 13:
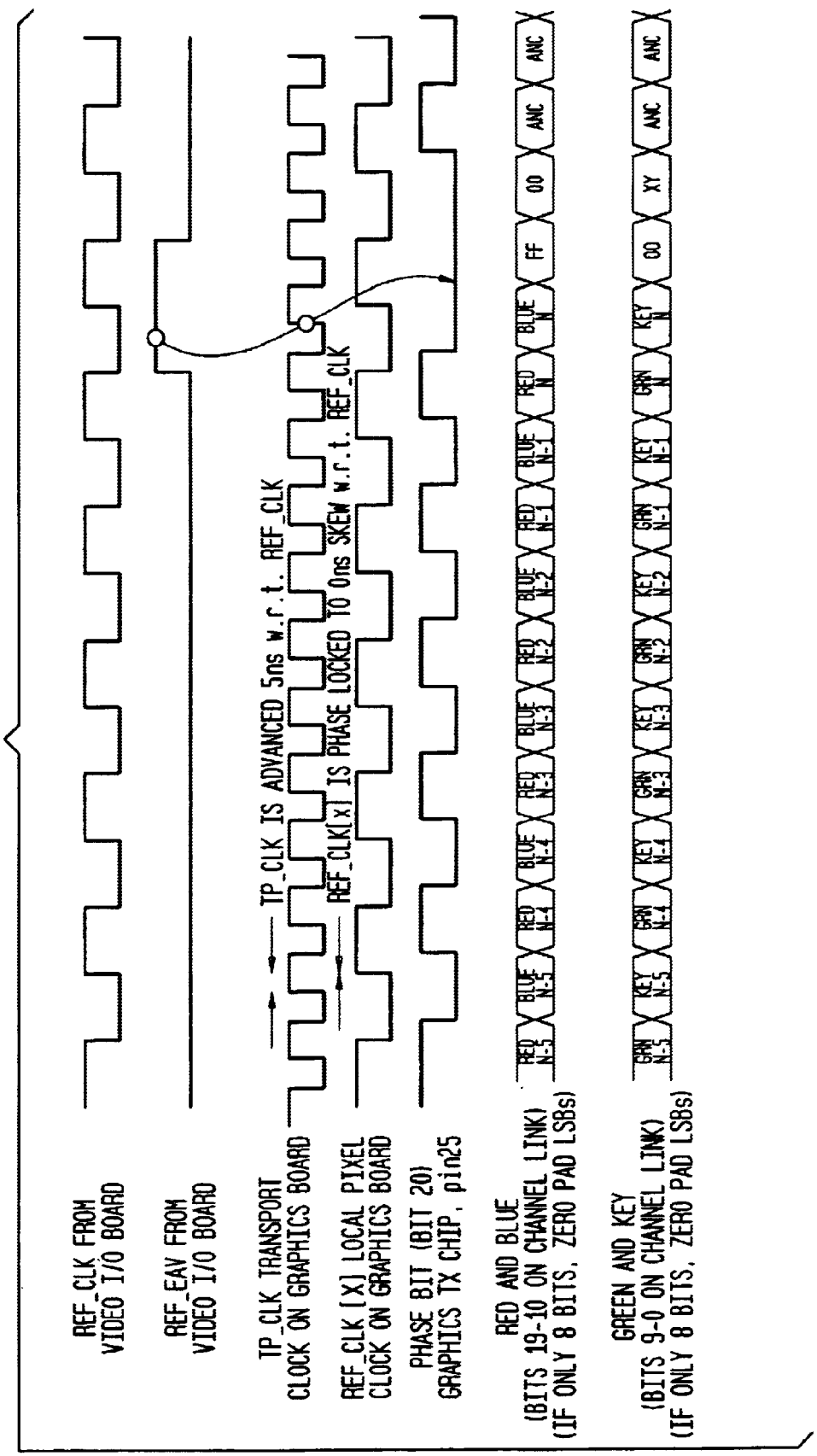
FIGS. 13 and 14 are diagrammatic representations of certain signals in the system of 1–12.
Figure 14:
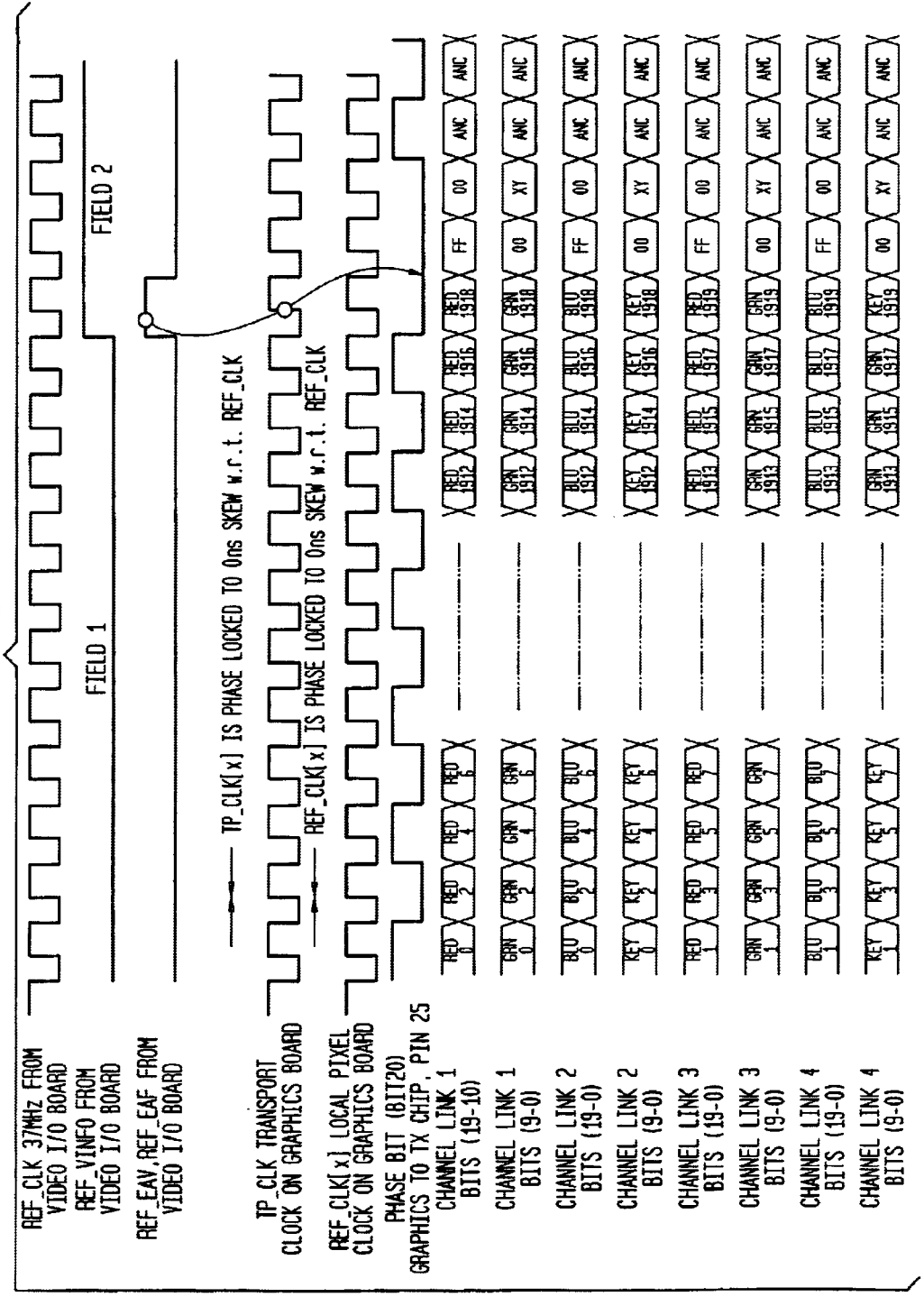

The Duet backplane is a custom backplane and includes three PCI/PCI bridges to accommodate PCI expansion cards. An overview of the Duet components is described in Section 3.3 of the Hardware Reference Guide for Chyron Duet. The backplane is described in Section 3.3.1 and connections thereto are shown in FIG. 3-1 of that Guide, the Duet Block Diagram. The backplane is further described in the Duet Technical Overview and the Duet Backplane Technical Specification.

In the preferred embodiment shown in the Hardware Reference Guide for Chyron Duet, the Chyron Duet hardware platform constitutes the, the "computer hardware system" 10 (FIG. 1) referred to in the claims. The PCI bus 12, also shown in the Duet Backplane Block Diagram and Duet System Backplane and Chassis Diagram of the Duet Backplane Technical Specification constitutes an embodiment of the first signal bus employing a first bus interface as referred to in the claims. The second signal bus 14 employing a second bus interface referred to in the claims has a preferred embodiment in the multipoint, multiplexed point-to-point bus shown in the same two figures above and described as data channels throughout the Duet Backplane Technical Specification documents. The Intel NX440LX 16 in those diagrams and the Windows NT operating system described in the CAL v1.0 Specification constitute embodiments of the general purpose computer and first operating system referred to in the claims. The "video graphics engine" (also referred to as the "video processor board") includes the RISC i960 processor and the multi-threaded, real-time operating system (RTOS) described at Section 3.0 in the Duet Hardware Reference Guide and comprise embodiments of the video graphics computer 18 and second operating system referred to in the claims. The array of point-to-point interconnects are embodied in the routing related to the channel links described in the Duet Backplane Technical Specification. The video streams are exemplified by the serially transmitted, low voltage differential signals which are multiplexed from a serial 21 bit TTL input stream as described in the Duet Backplane Technical Specification. The router and mixing circuits are exemplified by the functionality included on the MEC board described in the Duet Backplane Technical Specification. Examples of the bridges and first and second bus include the PCI bridges and resulting bus segments shown in Duet Backplane Block Diagram and Duet System Backplane and Chassis Diagram of the Duet Backplane Technical Specification. The steps of the method claims below are described throughout the above enclosed literature.

With respect to video signals on each channel link, each component (e.g. YUVa or RGBA) is sampled at 4 times its highest frequency, with 10 bit precision. Ten bits for 4 components is 40 bits.per sample; the 4:4:4:4 refers to the sampling rate for each component. RGBA stands for Red Green Blue Alpha (transparency) YUV is the standard used for television transmission. It is a transcode of the RGB components to luminance (Y) and chrominance (U,V). This allows B&W sets to receive a signal (looks at the Y component only). Each one of these components is sampled at 13.5 MHz in a high quality digital video system.

Software

CAL is a powerful programming tool that simplifies the work involved in creating real time 2D and 3D graphics and animation for Chyron video graphics hardware. The CAL v1.0 specification provides the software procedures required to access and to control the Chyron video graphics hardware and essentially specifies the software interface (i.e. API). CAL is implemented as a 32 bit windows component that can be incorporated into a functionality of any high level program written for Windows NT using video C++, Visual Basic, or Delphi. CAL is a platform independent software driver thereby permitting CAL applications to be previewed and displayed on any system running Windows NT.

Lyric is a character generator/graphics application comprising two and three dimensional functions. Lyric runs on Chyron's DUET hardware platform for online production and playback, as well as on Windows NT PCs for off line composition. Content related to multipurpose media processing systems may be created off-line on a conventional PC and reproduced in broadcast quality in a variety of video formats on the DUET platform and other Chyron systems, or on PCs equipped with Open Graphics Library ("OGL") video graphics accelerators. An open platform scalable for digital television, Duet is a video system and includes a powerful Windows NT computer, not a computer with video capabilities plugging in as an afterthought. Lyric can be manipulated to a standard graphical user interface such as Microsoft Windows as illustrated in the Lyric handbook.

The following documents are incorporated by reference herein and copies of these documents are included as part of the aforesaid provisional application 60/146,762, which is incorporated herein by reference:

1. Duet Backplane Technical Specification
2. Duet Technical Overview
3. Lyric Real Time 3D Graphics Application Handbook
4. CHYRON FAQ
5. CHYRON Duet Reference Guide
6. Duet Ordering Guide
7. CHYRON Call Developer Reference Guide
8. Duet Feature/Benefit Analysis
9. Infinit!—Graphic Workstations and Applications for the Digital Future
10. MAX!—Graphic Workstations and Applications for the Digital Future
11. MAXINE!—Graphic Workstations and Applications for the Digital Future
12. Infinit! MAX! and MAXINE!—Graphic Workstations and Applications for the Digital Future
13. Duet HD—Ordering Guide
14. LYRIC Graphic Workstations and Applications for the Digital Future
15. Duet and Duet HD Graphic Workstations and Applications for the Digital Future

What is claimed is:

1. A computer hardware system for editing a video signal comprising:

a first signal bus employing a first bus interface;

a second signal bus employing a second bus interface, and including an array of point-to-point interconnects, wherein each point-to-point interconnect is a multiplexed channel link capable of carrying a digital video stream, said video signal being carried by second signal bus along one or more of said point-to-point interconnects;

a router circuit for managing the routing of point-to-point interconnects on said second signal bus;

an I/O circuit for inputting and outputting said video signal to said computer hardware system, said I/O circuit converting said video signal into said digital video streams and routing said digital video streams to said router circuit;

a general purpose computer connected to said first bus and operating according to a first operating system; and a plurality of video graphics computers, said video graphics computers having inputs and outputs connected to said point-to-point interconnects of said second signal bus, said routing circuit being operative to vary routing of said video streams through said point to point interconnects so as to pass said video streams through different ones of said video graphics computers.

2. The system of claim 1 wherein said general purpose computer is operative to command said video graphics computers to vary the alterations of a video signal input to each of said video graphics computers.

3. The system of claim 1 wherein said general purpose computer is operative to command said routing circuit to vary said routing of point-to-point interconnects on said second signal bus such that different video signals are presented to different ones of said video graphics computers.

* * * * *